(12) United States Patent
Neff et al.

(10) Patent No.: US 6,249,746 B1
(45) Date of Patent: Jun. 19, 2001

(54) AUTOMATED SEISMIC ISOCHRON ANALYSIS

(75) Inventors: Dennis B. Neff; Scott A. Runnestrand; Edgar L. Butler, all of Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/434,853

(22) Filed: Nov. 4, 1999

(51) Int. Cl.[7] ............................................. G01V 1/28
(52) U.S. Cl. ............................................................ 702/16
(58) Field of Search .................................. 702/14, 16, 17, 702/18; 367/72, 73

(56) References Cited

U.S. PATENT DOCUMENTS

| | | | |
|---|---|---|---|
| 5,257,242 | 10/1993 | Clawson | 367/38 |
| 5,648,939 | 7/1997 | Folstad et al. | 367/73 |
| 5,796,678 | 8/1998 | Pisetski | 367/38 |
| 6,092,025 | * 6/2000 | Neff | 702/10 |

* cited by examiner

Primary Examiner—Donald E. McElheny, Jr.
(74) Attorney, Agent, or Firm—George E. Bogatie

(57) ABSTRACT

A computer implemented method for mapping seismic attributes derived from analysis of isochron measurements is disclosed. According to the disclosed method planar surfaces, which model the upper and lower surface of a subterranean layer, are numerically inserted in a seismic data volume with the edges of the planar surfaces connecting reflection events of a three-by-three array of seismic traces. Using the model surfaces, isochron attributes are calculated including the amount of isochron thickening or thinning in the direction of dip, and the azimuth of maximum thickness change. The thus calculated attributes are written to data cubes, which can be displayed in a variety of ways.

12 Claims, 3 Drawing Sheets

(1 of 3 Drawing Sheet(s) Filed in Color)

AUTOMATED SEISMIC ISOCHRON ANALYSIS

This invention relates to seismic prospecting for oil and gas reservoirs, and more specifically it relates to processing seismic data in a high speed digital computer for automating a technique used for mapping isochron attributes of a subterranean layer.

BACKGROUND OF THE INVENTION

For many years seismic exploration for oil and gas has involved the use of a source of seismic energy and its reception by an array of seismic detectors, generally referred to as geophones. When used on land, the source of seismic energy can be a high explosive charge electrically detonated in a borehole located at a selected point on a terrain, or another energy source having capacity for delivering a series of impacts or mechanical vibrations to the earths surface. Offshore, air gun sources and hydrophone receivers are commonly used. The acoustic waves generated in the earth by these sources are transmitted back from strata boundaries and/or other discontinuities and reach the earth's surface at varying intervals of time, depending on the distance traversed and the characteristics of the subsurface traversed. On land these returning waves are detected by the geophones, which function to transduce such acoustic waves into representative electrical analog signals, which are generally referred to as traces. In use on land an array of geophones is laid out along a grid covering an area of interest to form a group of spaced apart observation stations within a desired locality to enable construction of three dimensional (3D) views of reflector positions over wide areas. The source, which is offset a desired distance from the geophones, injects acoustic signals into the earth, and the detected signals at each geophone in the array are recorded for later processing using digital computers, where the analog data is generally quantized as digital sample points, e.g., one sample every two milliseconds, such that each sample point may be operated on individually. Accordingly, continuously recorded seismic field traces are reduced to vertical cross sections and/or horizontal map views which approximate subsurface structure. The geophone array is then moved along to a new position and the process is repeated to complete a seismic survey. A 3D seismic survey is data gathered at the surface and presented as a data volume representation of a portion of the subsurface.

After exploration of an area is completed, data relating to energy detected at a plurality of geophones will have been recorded, where the geophones are located at varying distances from the shotpoint. The data is then reorganized to collect traces from data transmitted at various shotpoints and recorded at various geophone locations, and the traces are grouped such that the reflections can be assumed to have been reflected from a particular point within the earth, e.g., a common midpoint. The individual records or "traces" are then corrected for the differing distance the seismic energy travels through the earth from the corresponding shotpoints, to the common midpoint, and upwardly to the various geophones. This step includes correction for the varying velocities through rock layers of different types and changes in the source and receiver depths. The correction for the varying spacing of shotpoint/geophone pairs is referred to as "normal move out." After this is done the group of signals from the various midpoints are summed. Because the seismic signals are of a sinusoidal nature, the summation process serves to reduce noise in the seismic record, and thus increasing its signal-to-noise ratio. This process is referred to as the "stacking" of common midpoint data, and is well known to those skilled in the art. Accordingly, seismic field data undergoes the above-mentioned corrections, and may also undergo migration, which is an operation on uninterpreted data and involves rearranging of seismic information so that dipping horizons are plotted in their true location. Other more exotic known processing techniques may also be applied, which for example enhance display of faults and stratigraphic features or some attribute such as peak amplitude, instantaneous frequency or phase, polarity etc., before the continuously recorded traces are reduced to vertical or horizontal cross sections or horizontal map views.

In the course of seismic exploration, geoscientists often use isochron maps based on the vertical separation of seismic horizons. As used herein, an isochron is a line on a map which represents an equal time difference between two reflections events. Accordingly, an isochron indicates a time thickness between horizons which can be used to predict geological features such as sand thickness, basin outline, direction of sediment transport, etc. The vertical separation between horizons can range from several thousand feet to separation distances approaching zero feet at a pinchout. Construction of isochron maps, however, requires a preprocessing step for determination of upper and lower horizons of a target interval, which is a significant obstruction because the horizons are typically determined manually or interactively on a workstation. In either event a great cost in time and money is expended in determining the horizons.

Accordingly it is an object of this invention to reduce the manual effort expended in defining horizons in seismic data volumes.

A more specific object of this invention is to depict the azimuth of maximum thickness change of a subterranean layer.

Yet another object is to depict the amount of isochron thickening or thinning of a subterranean layer.

Another object of this invention is to provide isochron attribute data which can be displayed in many different ways.

Yet another object is to aid the geoscientists in analyzing geological features such as thickness of subterranean sand layers, which helps the geoscientists decide where to site oil drilling rigs.

SUMMARY OF THE INVENTION

According to the present invention, the foregoing and other objects and advantages are attained in a computer implemented method for automating a technical method used for mapping attributes of seismic isochron data, including the amount of isochron thickening or thinning, and the azimuth of maximum thickness change of a subterranean layer. The computer automated method comprises the following steps: defining a pair of planar surfaces corresponding to the upper and lower surface of a subterranean layer of interest within the 3D data volume in the computer memory; calculating the direction of maximum thickening between the planes, and writing this direction in a first 3D output data cube as an iso-azimuth value; calculating the magnitude of the isochron change per distance and writing this change per distance to a second 3D output data cube as an iso-change value; and displaying data recorded in the iso-azimuth and/or iso-change 3D data cubes.

In a preferred embodiment of this invention where horizons are automatically defined, a first step is determining if a planar surface can be associated with each digitized point in the data volume. This is done by examining each digitized point in the data volume to determine the probability that the data point resides on a planar subterranean surface. In this method, a trial plane is inserted in the data volume so as to include the point under test and to intersect a three-by-three array of nine traces with the digitized data point under test positioned at the center of the array. Then various azimuth and dip positions of the trial plane are examined using crosscorrelation techniques for comparing similarity among the nine traces that intersect the test plane, and a plane at a depth corresponding to the upper surface of the subterranean layer of interest is identified by selecting the position of the test plane having the highest overall similarity of traces in the three-by-three array. In a like manner a plane corresponding to the lower surface of the subterranean layer is identified.

In accordance with another aspect of this invention, the apparatus comprises a computer programmed to carry out the above described method steps for defining planar surfaces in the seismic data volume, constructing isochron maps, and processing data for isochron attribute analysis.

The method and apparatus of this invention, using an automated method for identifying horizons thus reduces manual effort to a small percent of the previously required manual effort to provide data which depicts the amount of isochron thickening or thinning, and the azimuth of the maximum thickness change for a subterranean layer. It is useful over an entire data volume or any subset thereof, and is particularly valuable when large numbers of isochron analyses are required to be performed.

Still other objects and advantages of the present invention will become readily apparent to those skilled in the art from the following detailed description and the drawings, wherein there is shown and described only the preferred embodiments of this invention. As will be realized, this invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION OF THE PREFERRED EMBODIMENT

The method of this invention assumes that conventional data processing has been applied to the 3D data volume up to and including normal moveout and migration of common depth point gathers of seismic traces. A further assumption is that the digitized data points in the data volume are identifiable throughout the seismic data volume by association with x, y and z space coordinates of the earth, which define the location of the data points in the seismic survey.

Figure 1:
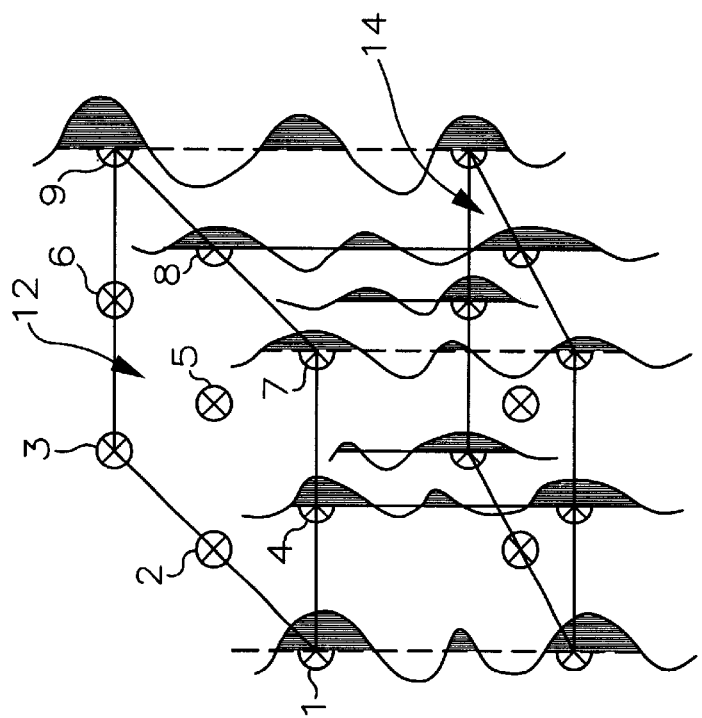
FIG. 1 illustrates a three-by-three array of seismic traces reflecting from the surface of an upper plane and a lower plane of a subterranean layer, where the planes can be modeled by numerical insertion in a 3D seismic data volume to allow calculation of delta isochron values according to this invention.

Referring now to FIG. 1, two planes 12 and 14 are illustrated, which are representative of the upper and lower surfaces of a subterranean layer of interest. These planes are mathematically modeled by numerical insertion into a seismic data volume in computer memory. While an ordinary size data volume could contain hundreds or thousands of digitized traces only nine zero offset traces, designated by the reference characters 1 through 9 are shown in FIG. 1 to illustrate the invention. These nine traces illustrate the two way seismic signal travel time to the various reflection events. The method by which seismic data is obtained and reduced to digital form for processing as a 3D data volume in a computer is well known to those skilled in the art.

Figure 3:
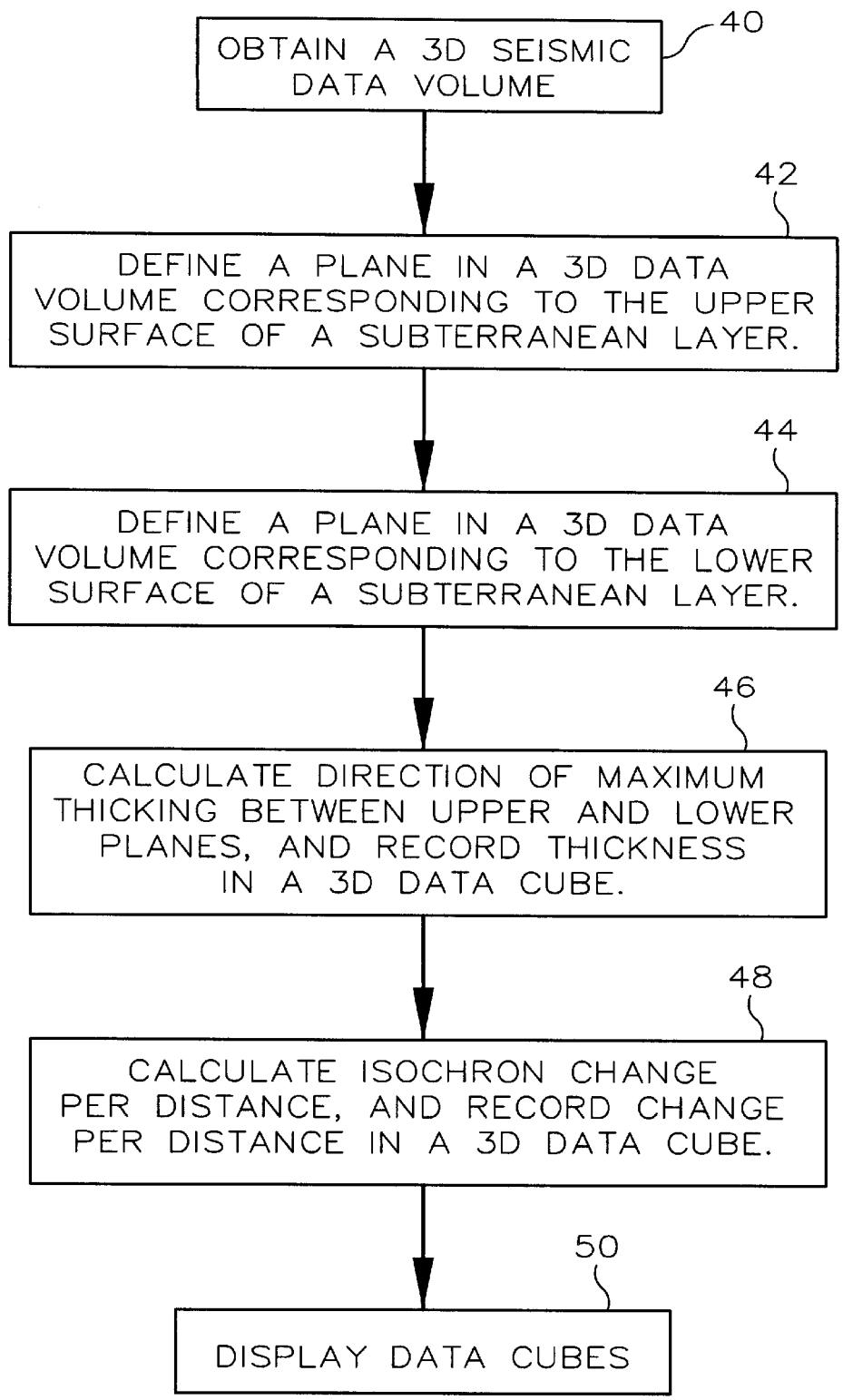
FIG. 3 is a flow diagram illustrating the presently preferred data processing steps of this invention.

The first step in the invention, as shown at reference numeral 42 in the flow chart of FIG. 3, is defining a plane surface corresponding to the upper surface of the subterranean target layer. In automating this method each digitized point in the data volume is examined to determine the probability that it can be associated with a planar subterranean surface. This is done by inserting a trial plane in the data volume as illustrated for example by the plane 12 in FIG. 1. As shown, the trial plane is positioned to intersect reflection events of a three-by-three array of generally uniformly spaced traces. Crosscorrelation techniques comparing segments of the eight perimeter traces against the central trace are then used to determine a correlation coefficient for the particular position of the trial plane.

The crosscorrelation operation involves the trial plane, which is positionable at various azimuth and dip positions anywhere within the data volume, and a three-by-three array of seismic traces, which include a central trace and eight perimeter traces that are reflected from the perimeter of the trial plane. A selected segment of the central trace, illustrated at 5 in FIG. 1, is individually crosscorrelated against corresponding segments of each of its eight adjacent traces so as to determine eight crosscorrelation values. These crosscorrelation values are combined to determine a combined coefficient representative of the goodness of fit of the trial plane. Various azimuth and dip positions of the trial plane about the fixed central point as well as various lags applied to the perimeter traces are examined in a similar manner, where the dip of the trial plane is limited to forty-five degrees. Accordingly, the trial plane having the highest correlation coefficient is the optimum or "best fit" position of the plane and is selected as the plane corresponding to the upper surface of the subterranean layer. Then repeating the plane identifying process at a predetermined increased reflection time locates a second plane corresponding to the lower surface of the subterranean layer.

The trace correlation is made using an extended correlation algorithm that considers both shape and absolute amplitude of the waveforms being compared. This extended correlation calculation is carried out over a predefined time window, and for a series of time lags applied to the perimeter traces to identify possible dipping positions of the test plane. As previously mentioned the eight individual correlation values are combined to obtain one value for association with the position of the plane which includes the central point in the array. Accordingly, the correlation coefficient among the nine traces in the array is maximized at a particular azimuth and dip position, which position is used to identify the best fit test plane. The optimum position, i.e., x, y and z spatial coordinates of the center trace plus the dip and azimuth of the best fit plane for the digitized point under test are recorded for later use in selecting the plane corresponding to the surface of the layer.

The extended crosscorrelation operator used to determine coherency among the nine traces intersecting the test plane applies the well known normalized correlation coefficient, which is a measure of linear relationship between two waveforms, in combination with a normalized absolute amplitude difference term as follows:

Given two time series ($A_i$ and $B_i$) of length N, the normalized correlation coefficient ($X_{(a,b)}$) is calculated as:

$$X_{(a,b)} = \frac{\sum_{i=1}^{N} a_i \cdot b_i}{\sqrt{\sum_{i=1}^{N} a_i^2} \cdot \sqrt{\sum_{i=1}^{N} b_i^2}}$$

where the length N is a comparison window corresponding to the selected time, or depth interval of interest, that corresponds to the dip orientation of the test plane e.g. the plane 12 illustrated in FIG. 1.

The normalized amplitude difference ($D_{(a,b)}$) is defined as follows:

$$D_{(a,b)} = \frac{\sum_{i=1}^{N}(|a_i|+|b_i|) - \sum_{i=1}^{N}|a_i - b_i|}{\sum_{i=1}^{N}(|a_i|+|b_i|)}$$

This equation yields a difference coefficient that is similar in form to the normalized correlation coefficient in that two identical waveforms being compared will yield a coefficient of 1.0. The extended correlation algorithm, hereinafter referred to as an RB-factor, is then defined as the weighted average of the two above measures as follows:

$$RB_{(a,b)} = wX(a,b) + (1-w)D(a,b)$$

where w is a weighting factor between 0 and 1, and is commonly set to 0.5 for equal weighting of shape and amplitude.

The method of this invention then proceeds to step 44 in FIG. 3, where the above described process for identifying a plane corresponding to the upper surface of a layer is repeated using the same central trace to determine a plane corresponding to the lower surface of the subterranean target layer of interest. This process is repeated for a time (or depth) interval between planes selected by the user to identify the location of the plane corresponding to the lower surface of the subterranean layer. Preferably, the selected incremental time interval will be in a range of from about twelve milliseconds to about one-hundred milliseconds to identify the plane corresponding to the lower surface of the target layer.

Figure 2:
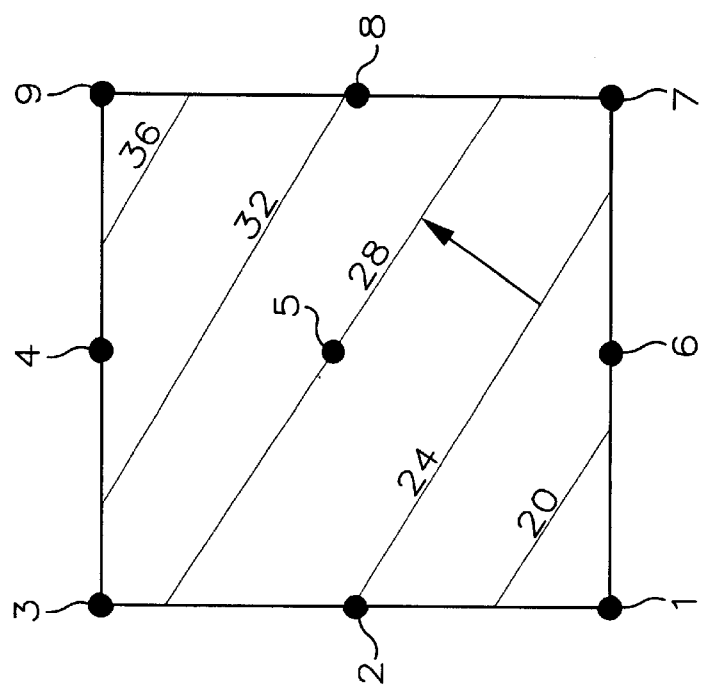
FIG. 2 illustrates an isochron map corresponding to FIG. 1, which is constructed using the automated method according to the present invention. Values are indicated in milliseconds for the isochron lines.

Next, in step 46 of FIG. 3, the direction of maximum thickening between upper and lower planes 12 and 14 in FIG. 1 is calculated using the previously recorded x, y and z spatial coordinates of the center points and the dip and azimuth of the selected planes. This direction value, which is illustrated as the arrow 16 in FIG. 2, is written as an iso-azimuth value to a 3D output data cube which is suitable for subsequent display.

Proceeding to calculation step 48, the magnitude of isochron change for a given distance (e.g. 5.2 ms per 100 m) is calculated, again using the previously recorded spatial coordinates for the planes 12 and 14. If the magnitude of the isochron change is increasing in the same direction as the dip of plane 12, then the magnitude change value is assigned a positive value. Conversely, if the modeled layer thins in the direction of dip of plane 12 the isochron magnitude change value is assigned a negative value. The isochron change is then written to a second new 3D output data cube, which is suitable for display.

Figure 4:
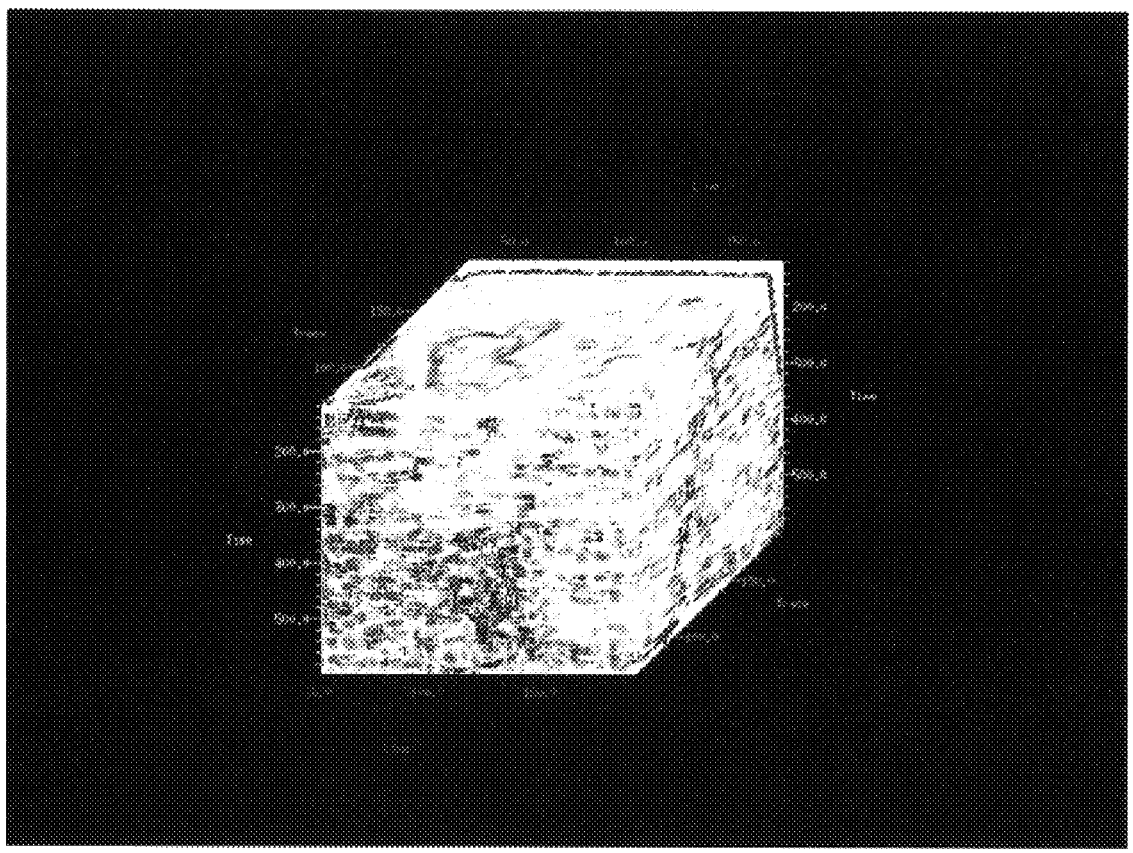
FIG. 4 is a color illustration of a delta isochron cube showing color coding of positive and negative delta isochron values.

FIG. 4 is an exemplarily color figure that is an output display according to this invention. This figure shows a delta isochron cube using a color code in which red indicates a positive delta isochron value, blue represents a negative value, and shades of the color are representative of the absolute magnitude of the isochron change.

At step 50, a display of the 3D output data cubes created in the previous steps is produced. Many different ways may be used to display the results recorded in the output data cubes containing values for iso-azimuth and the iso-change of the isochron map. These data cubes may be displayed as a background to the seismic wiggle traces, and/or in animated horizontal or vertical slices e.g. through the iso/azimuth cubes to depict details of geological features. The iso-azimuth and iso-change cubes can also be merged using existing color wheel presentation to show a composite iso/azimuth/change attribute volume.

The invention as described and illustrated herein is an effective method and apparatus for automating a time consuming procedure that geoscientists often use in stratigraphic analysis based on seismic isochron data. However, those skilled in the art will recognize that many modifications and variations of this invention are possible in light of the above teachings without departing from the spirit of the invention. It is understood that the present invention is not intended to be limited by the particular features described in detail and illustrated in the specification and drawings but the concept of this invention is to be measured by the scope of the appended claims.

That which is claimed is:

1. A method of processing data for mapping seismic isochron attribute values of a subterranean layer, said data comprising a digitized seismic trace data volume stored in a computer memory, wherein said digitized seismic trace data is arranged in said data volume such that each digitized point is identifiable by a three dimensional (3D) spatial coordinate of the earth, said method comprising:

(a) defining a first plane in said data volume corresponding to the upper surface of said subterranean layer;
    (b) defining a second plane in said data volume corresponding to the lower surface of said subterranean layer;
    (c) calculating the direction of maximum thickening of said subterranean layer at a plurality of data points associated with said upper plane and said lower plane, wherein said direction of maximum thickening is an isochron attribute designated as an iso-azimuth value; and
    (d) writing said iso-azimuth value for said plurality of data points determined in step (c) to a 3D output data cube suitable for visual display of said iso-azimuth values.

2. A method of processing data for mapping seismic isochron attributes of a subterranean layer, said data comprising a digitized seismic trace data volume stored in a computer memory, wherein said digitized seismic trace data is arranged in said data volume such that each digitized point is identifiable by a three dimensional (3D) spatial coordinate of the earth, said method comprising:

(a) defining a first plane in said data volume corresponding to the upper surface of said subterranean layer;

(b) defining a second plane in said data volume corresponding to the lower surface of said subterranean layer;

(c) calculating the magnitude of isochron change for a specified distance over said subterranean layer at a plurality of data points associated with said upper plane and said lower plane, wherein said magnitude of isochron change is an isochron attribute designated as an iso-change value; and (d) writing said iso-change value for said plurality of data points determined in step (c) to a 3D output data cube suitable for visual display of said iso-change value.

3. A method in accordance with claim 1, additionally comprising:

calculating the magnitude of isochron change for a specified distance over said subterranean layer at a plurality of data points associated with said upper plane and said lower plane, wherein said magnitude of isochron change is an isochron attribute designated as an iso-change value; and writing said iso-change value to said 3D output data cube for visual display of said iso-change attribute.

4. A method in accordance with claim 1, wherein said steps of defining said first plane and said second plane in said data volume comprises:

(a) numerically inserting a test plane within said 3D data volume, wherein said test plane intersects at least a three-by-three array of uniformly spaced seismic traces, and wherein the edge of said test plane is fitted to amplitude events of traces in said array;

(b) crosscorrelating segments of a central trace in said array against corresponding segments of each of its eight perimeter traces, wherein eight correlation coefficients are determined;

(c) combining said eight correlation coefficients determined in step (b) to determine a combined coefficient representative of the goodness of fit of said test plane in said array, and associating said combined coefficient with the central point in said three-by-three array;

(d) repeating steps (a), (b) and (c) for a plurality of test planes having various dip and azimuth positions about said central point, wherein a plurality of said combined correlation coefficients are determined;

(e) selecting the strike and dip of the plane having the highest correlation coefficient as determined in step (d) as the best fit plane for association with said central point; and (f) repeating steps (a) through (e) using each point in said data volume as a central point in said array, and selecting best fit planes for said upper surface and lower surface of said subterranean layers based on planes having the highest correlation coefficient.

5. A method in accordance with claim 4, wherein said test planes having various dip and azimuth positions about said central point of said array are limited to planes having dips less than forty-five degrees.

6. A method in accordance with claim 4, wherein said test planes are fitted to amplitude events of lagged perimeter traces about the fixed central point.

7. A method in accordance with claim 4, wherein said digitized seismic trace data comprises zero offset digitized traces.

8. A method in accordance with claim 4, wherein said crosscorrelation is performed using an algorithm that considers both shape and absolute amplitude of the waveforms being compared.

9. A method in accordance with claim 8, wherein said correlation algorithm includes a normalized absolute amplitude difference term defined as:

$$D_{(a,b)} = \frac{\sum_{i=1}^{N}(|a_i|+|b_i|) - \sum_{i=1}^{N}|a_i - b_i|}{\sum_{i=1}^{N}(|a_i|+|b_i|)}$$

where A(i) and B(i) are amplitude components of the time series of two waveforms being compared, and N is the length of time series being compared.

10. Apparatus for processing data for mapping seismic isochron attribute values of a subterranean layer, said data comprising a digitized seismic trace data volume stored in a computer memory, wherein said digitized seismic trace data is arranged in said data volume such that each digitized point is identifiable by a three dimensional (3D) spatial coordinate of the earth, said apparatus comprising:

a computer programmed to perform the following method steps:

(a) defining a first plane in said data volume corresponding to the upper surface of said subterranean layer;

(b) defining a second plane in said data volume corresponding to the lower surface of said subterranean layer;

(c) calculating the direction of maximum thickening of said subterranean layer at a plurality of data points associated with said upper plane and said lower plane, wherein said direction of maximum thickening is an isochron attribute designated as an iso-azimuth value; and (d) writing said iso-azimuth value for said plurality of data points determined in step (c) to a 3D output data cube suitable for visual display of said iso-azimuth values.

11. Apparatus for processing data for mapping seismic isochron attributes of a subterranean layer, said data comprising a digitized seismic trace data volume stored in a computer memory, wherein said digitized seismic trace data is arranged in said data volume such that each digitized point is identifiable by a three dimensional (3D) spatial coordinate of the earth, said apparatus comprising:

a computer programmed to perform the following method steps:

(a) defining a first plane in said data volume corresponding to the upper surface of said subterranean layer;

(b) defining a second plane in said data volume corresponding to the lower surface of said subterranean layer;

(c) calculating the magnitude of isochron change for a specified distance over said subterranean layer at a plurality of data points associated with said upper plane and said lower plane, wherein said magnitude of isochron change is an isochron attribute designated as an iso-change value; and d) writing said iso-change value for said plurality of data points determined in step (c) to a 3D output data cube suitable for visual display of said iso-change values.

12. Apparatus in accordance with claim 10, wherein said method step of defining said first plane and said second plane in said data volume comprises:
- (a) numerically inserting a test plane within said 3D data volume, wherein said test plane intersects at least a three-by-three array of generally uniformly spaced seismic traces, and wherein the edge of said test plane is fitted to amplitude events of traces in said array;
- (b) crosscorrelating segments of a central trace in said array against corresponding segments of each of its eight perimeter traces, wherein eight correlation coefficients are determined;
- (c) combining said eight correlation coefficients determined in step (b) to determine a combined coefficient representative of the goodness of fit of said test plane in said array, and associating said combined coefficient with the central point in said three-by-three array;
- (d) repeating steps (a), (b) and (c) for a plurality of test planes having various dip and azimuth positions about said central point, wherein a plurality of said combined correlation coefficients are determined;
- (e) selecting the strike and dip of the plane having the greatest correlation coefficient as determined in step (d) as the best fit plane for association with said central point; and
- (f) repeating steps (a) through (e) using each point in said data volume as a central point in said array, and selecting best fit planes for said upper surface and lower surface of said subterranean layers based on planes having the highest correlation coefficient.

* * * * *